US009654621B2

(12) United States Patent
Yu et al.

(10) Patent No.: US 9,654,621 B2
(45) Date of Patent: May 16, 2017

(54) METHODS AND DEVICES FOR PROMPTING CALLING REQUEST

(71) Applicant: Xiaomi Inc., Beijing (CN)

(72) Inventors: Mingyang Yu, Beijing (CN); Xiaodan Zhang, Beijing (CN); Baiming Ma, Beijing (CN); Wei Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/835,394

(22) Filed: Aug. 25, 2015

(65) Prior Publication Data
US 2016/0156777 A1    Jun. 2, 2016

Related U.S. Application Data

(63) Continuation of application No. PCT/CN2015/080682, filed on Jun. 3, 2015.

(30) Foreign Application Priority Data

Nov. 28, 2014  (CN) .......................... 2014 1 0713413

(51) Int. Cl.
H04W 4/16        (2009.01)
H04M 3/42        (2006.01)
(Continued)

(52) U.S. Cl.
CPC ....... *H04M 3/42051* (2013.01); *H04M 1/578* (2013.01); *H04M 3/4288* (2013.01); *H04W 4/16* (2013.01); *H04W 8/183* (2013.01)

(58) Field of Classification Search
CPC ............. H04M 1/578; H04M 3/42051; H04M 3/4288; H04M 3/42042; H04W 4/16; H04W 8/183
(Continued)

(56) References Cited

U.S. PATENT DOCUMENTS 5,796,806 A * 8/1998 Birckbichler ......... H04M 1/663
                                                    379/207.15
6,400,809 B1 * 6/2002 Bossemeyer, Jr.  H04M 3/42042
                                                    379/142.08
(Continued)

FOREIGN PATENT DOCUMENTS

CN       1364020 A      8/2002
CN       1510952 A      7/2004
(Continued)

OTHER PUBLICATIONS

International Search Report dated Sep. 2, 2015 for corresponding International Application No. PCT/CN2015/080682, 4 pages.
(Continued)

*Primary Examiner* — Nathan Taylor
(74) *Attorney, Agent, or Firm* — Quarles & Brady LLP

(57) ABSTRACT

The present disclosure relates to a method for prompting a calling request and a device for the same, which belong to the field of electronic technology. The method includes: receiving a calling request from a second terminal during a call session with a first terminal, the calling request carrying a communication identification of the second terminal; inquiring whether the first user information corresponding to the communication identification of the second terminal is in a contact list stored in local; and converting the first user information to corresponding first audio data through an audio transformation according to the first user information, and playing the first audio data during the call session.

20 Claims, 5 Drawing Sheets

(51) Int. Cl.
*H04M 1/57* (2006.01)
*H04M 3/428* (2006.01)
*H04W 8/18* (2009.01)

(58) Field of Classification Search
USPC .......... 455/415; 379/215.01, 142.08, 201.01, 379/88.2
See application file for complete search history.

(56) References Cited

U.S. PATENT DOCUMENTS

| | | | | |
|---|---|---|---|---|
| 6,778,655 | B1* | 8/2004 | Veschi | H04M 1/57 379/142.08 |
| 2001/0043691 | A1* | 11/2001 | Bull | H04M 1/57 379/142.08 |
| 2002/0196914 | A1* | 12/2002 | Ruckart | H04M 1/578 379/88.21 |
| 2006/0140379 | A1* | 6/2006 | Yamamoto | H04M 1/663 379/215.01 |
| 2006/0251232 | A1* | 11/2006 | Wuthnow | H04M 7/006 379/201.01 |
| 2008/0212754 | A1 | 9/2008 | Maciejewski et al. | |
| 2011/0263235 | A1* | 10/2011 | Kassiedass | H04M 1/578 455/415 |
| 2013/0016819 | A1* | 1/2013 | Cheethirala | H04M 1/65 379/142.05 |

FOREIGN PATENT DOCUMENTS

| | | |
|---|---|---|
| CN | 101404699 A | 4/2009 |
| CN | 101917506 A | 12/2010 |
| CN | 102006359 A | 4/2011 |
| CN | 102316430 A | 1/2012 |
| CN | 102651857 A | 8/2012 |
| CN | 103795839 A | 5/2014 |
| CN | 103945065 A | 7/2014 |
| CN | 104539789 A | 4/2015 |
| EP | 1575252 A1 | 9/2005 |
| EP | 2381659 A1 | 10/2011 |
| JP | 2005124062 A | 5/2005 |
| JP | 2007194691 A | 8/2007 |
| JP | 2010268178 A | 11/2010 |
| KR | 10-2005-0104783 A | 11/2005 |
| KR | 10-0585556 B1 | 6/2006 |
| KR | 10-0677362 B1 | 2/2007 |
| RU | 2271615 C2 | 3/2006 |

OTHER PUBLICATIONS

European Search Report issued in European Patent Application No. 15 19 5319, dated Jun. 8, 2016, 10 pages.
Office Action issued in Chinese Patent Application No. 201410713413.4, mailed Aug. 19, 2016, 7 pages.
Office Action issued in Korean Patent Application No. 10-2015-7020868, mailed Sep. 14, 2016, 7 pages.
International Search Report issued in PCT Application No. PCT/CN2015/080682, mailed Sep. 2, 2015, 2 pages.
Office Action for Russian Patent Application No. 2015128657 dated Nov. 7, 2016.
Office Action for Japanese Patent Application No. 2016561071 dated Jan. 25, 2017.

* cited by examiner

METHODS AND DEVICES FOR PROMPTING CALLING REQUEST

CROSS-REFERENCE TO RELATED APPLICATIONS

This application is a Continuation Application of International Application No. PCT/CN2015/080682, filed Jun. 3, 2015, which is based upon and claims priority to Chinese Patent Application No. CN201410713413.4, filed Nov. 28, 2014, the entire contents of which are incorporated herein by reference.

TECHNICAL FIELD

The present disclosure generally relates to the field of electronic technology, and more particularly, to methods and devices for prompting a calling request.

BACKGROUND

With rapid development of communication technology, mobile phones have become one kind of indispensible electronic devices in daily lives. In particular, with electronic devices becoming intelligent nowadays, users of smart phones are growing in numbers.

Conventionally, when a user is in a call through a mobile phone, the mobile phone detects that the screen is in the proximity of a human body through a distance sensor, and shuts down the screen. When the mobile phone receives another calling request during the call, the speaker will emit a prompting beep "du . . . du . . . ." When the user puts down the mobile phone, the distance sensor detects that the screen is taken away from the human body, and then the screen is lit up to display relevant information on the calling request such that the user may decide whether to accept the calling request according to the information.

SUMMARY

According to a first aspect of embodiments of the present disclosure, there is provided a method for prompting a calling request implemented in a device. In the method, the device receives a calling request from a second terminal during a call session with a first terminal, where the calling request carries a communication identification of the second terminal. The device inquires whether first user information corresponding to the communication identification of the second terminal is in a contact list stored in a local storage. The device converts the first user information to corresponding first audio data through an audio transformation according to the first user information, and plays the first audio data during the call session.

According to a second aspect of embodiments of the present disclosure, there is provided a device for prompting a calling request. The device includes: a processor; and a memory for storing instructions executable by the processor. The processor is configured to receive a calling request from a second terminal during a call session with a first terminal, where the calling request carrying a communication identification of the second terminal. The processor is further configured to inquire whether first user information corresponding to the communication identification of the second terminal is in a contact list stored in a local storage. The processor is configured to convert the first user information to corresponding first audio data through an audio transformation according to the first user information, and playing the first audio data during the call session.

According to a third aspect of embodiments of the present disclosure, there is provided a non-transitory computer-readable storage medium storing instructions that, when executed by a processor of a server, cause the server to perform: receiving a calling request from a second terminal during a call session with a first terminal, the calling request carrying a communication identification of the second terminal; inquiring whether first user information corresponding to the communication identification of the second terminal in a contact list stored in a local storage; and converting the first user information to corresponding first audio data through an audio transformation according to the first user information, and playing the first audio data during the call session.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Figure 1:
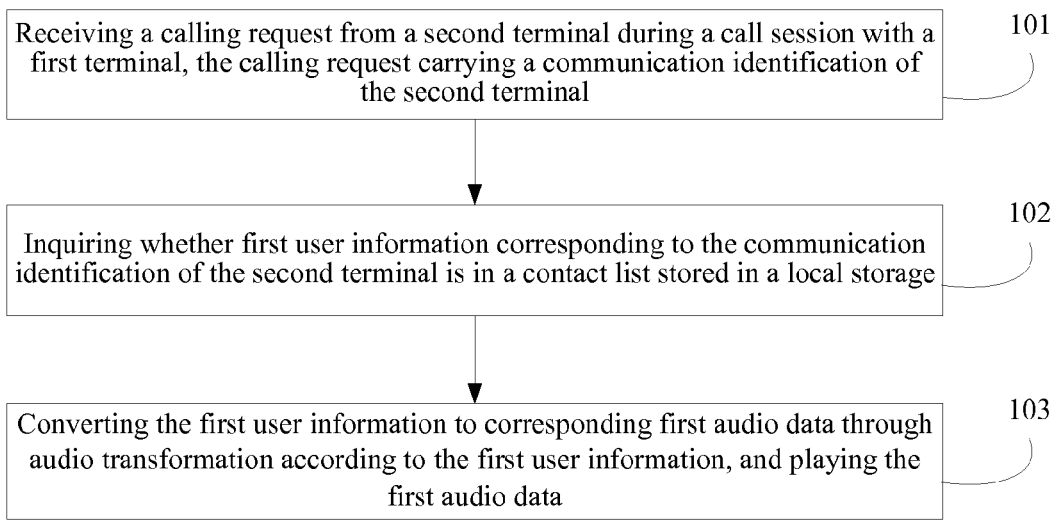
FIG. 1 is a flow chart of a method for prompting a calling request according to an exemplary embodiment.

Through the above accompany drawings, the specific embodiments of the present disclosure have been shown, for which a more detailed description will be given as below. These drawings and textual description are not intended to limit the scope of the concept of the present disclosure in any manner, but to explain the concept of the present disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In the current mobile phones, when a first program is running in a full screen mode or is in a call session, the user may be disturbed when a second program needs immediate attention. For example, when the user is in a first call session, a second incoming call may require the user to put down the mobile phone to determine whether to switch from the first call to a second call. The time period from the user puts down the mobile phone to the screen is lit up, until the user reads the user information (such as user name, and the like) of the calling request may be relatively long, which may result in the user missing important parts of the current call which may be required to be repeated by the other party. Therefore, efficiency in acquiring information is rather low.

The embodiments of the present disclosure provide a method for prompting a calling request by playing an audio message simultaneously with the running program. The method may play an audio message to notify the user about the second program while the first program is running in a full screen mode. In other words, the mobile device may conveniently notify the user by playing the audio message without quitting the full screen mode or display a message on the screen. The first program may include a first phone call session, a game application, etc. The second program may include a second incoming call, a video chat request, etc.

As shown in FIG. 1, the method may include the following steps implemented in a device. The device may include a mobile device, a smart phone, or any device with communication capability.

In step 101, the device receives a calling request from a second terminal during a call session with a first terminal, where the calling request includes a communication identification of the second terminal.

In step 102, the device inquires whether the first user information corresponding to the communication identification of the second terminal is in a contact list stored in a local storage of the device.

In step 103, the device converts the first user information to corresponding first audio data through an audio transformation according to the first user information. The device then plays the first audio data during the call session. The device may play the first audio data simultaneously with audio from the first running program. For example, the device may play the first audio data while playing voice messages from the firs terminal during the call session. When the first running program is a game application, the device may play the first audio data while the gaming music is playing. The device may increase the volume of the firs audio data gradually, which may be customized by a user of the device.

In the present embodiment, the device receives a calling request from a second terminal during a call session with a first terminal, the calling request carrying a communication identification of the second terminal; inquires whether first user information corresponding to the communication identification of the second terminal is in a contact list stored in local; and converts the first user information to corresponding first audio data through an audio transformation according to the first user information. The device then plays the first audio data. Thereby, when a user receives a calling request from a second terminal during a call session with a first terminal through a mobile phone hold in hand, the user may acquire user information on the second terminal from audio played by the speaker, without putting down the mobile phone to browse the contents displayed on the screen, thus information on the current call may not be missed. Thereby, the efficiency in acquiring information may be improved.

The embodiments of the present disclosure provide a method for prompting a calling request, which may be implemented by a terminal device (hereinafter referred to as "local terminal", to be distinguished from the terminal of the other party of the call,). For example, the local terminal may be a mobile phone, a tablet computer, a laptop computer, or the like. In the present embodiment, the method is specifically described as implemented by a mobile phone, for example, similar to other embodiments, which will not be repeated herein.

Hereinafter the method as shown in FIG. 1 is described in detail with reference to the embodiments, as follows.

In step 101, the local terminal receives a calling request from a second terminal during a call session with a first terminal, where the calling request may carry a communication identification of the second terminal.

For example, the communication identification may include identification information of a terminal for voice calls, such as a telephone number, or the like.

In an implementation, a user of the first terminal dials a telephone number of the local terminal through the first terminal, and triggers the first terminal to send a calling request to the local terminal. If a user of the local terminal clicks an accept button, the local terminal is triggered to establish a call connection with the first terminal. At this time, the local terminal and the first terminal is in a call. During the call, if a user of the second terminal dials the telephone number of the local terminal through the second terminal, the second terminal is triggered to send a second calling request to the local terminal. At this time, the local terminal receives the second calling request from the second terminal during the call with the first terminal. The second calling request may carry a communication identification of the second terminal, such as a telephone number of the second terminal.

In step 102, the local terminal inquires whether first user information corresponding to the communication identification of the second terminal is in a contact list stored in a local storage of the local terminal.

For example, the user information may include a name of a contact, relevant detail information on the contact (such as friend type, company, city, or the like).

In an implementation, the local terminal matches the communication identification with each of the communication identifications stored in a local contact list. If an identical communication identification is found, the user information (i.e. the first user information) such as a name of the contact corresponding to the communication identification stored in the contact list is further acquired, which is usually textual information. For example, if an incoming call number is "12345678900", the number is matched with each of the numbers in the contact list. If "12345678900" is found, user information corresponding to "12345678900" is acquired, such as "Zhang San".

In step 103, the local terminal convert the first user information to determine corresponding first audio data through an audio transformation according to the first user information, and plays the first audio data.

In an implementation, a text-audio database may be previously stored in a voice call application of the local terminal, in which audio data corresponding to each of the textual words may be stored. For example, a corresponding relationship between a stored character of "Wang" and audio data of "Wang." After the local terminal finds the first user information corresponding to the communication identification of the second terminal, the user information may be processed with audio transformation, and the audio data which has been found is combined in an order of the corresponding words, to obtain audio data corresponding to the first user information. In addition, the local terminal may also previously store common audio data for reporting in voice, such as audio data of "incoming call," and preset a position of the common audio data where the audio data corresponding to the first user information may be inserted, for example, before the common audio data. After the local terminal determines the audio data corresponding to the first user information, the audio data may be inserted to the corresponding position of the common audio data, to obtain audio data to be played (i.e. the first audio data). Afterwards, the local terminal may play the first audio data. The playing of the first audio data and the playing of audio data of the call with the first terminal may be simultaneously performed. For example, the local terminal searches out the first user information "Li Si," and transforms the textual information "Li" and "Si" respectively to audio data of "Li" and "Si," to obtain audio data of "Li Si". Then, the audio data of "Li Si" is inserted before the preset audio data "incoming call," to obtain audio data of "Li Si incoming call" which is played by the speaker.

Figure 2:
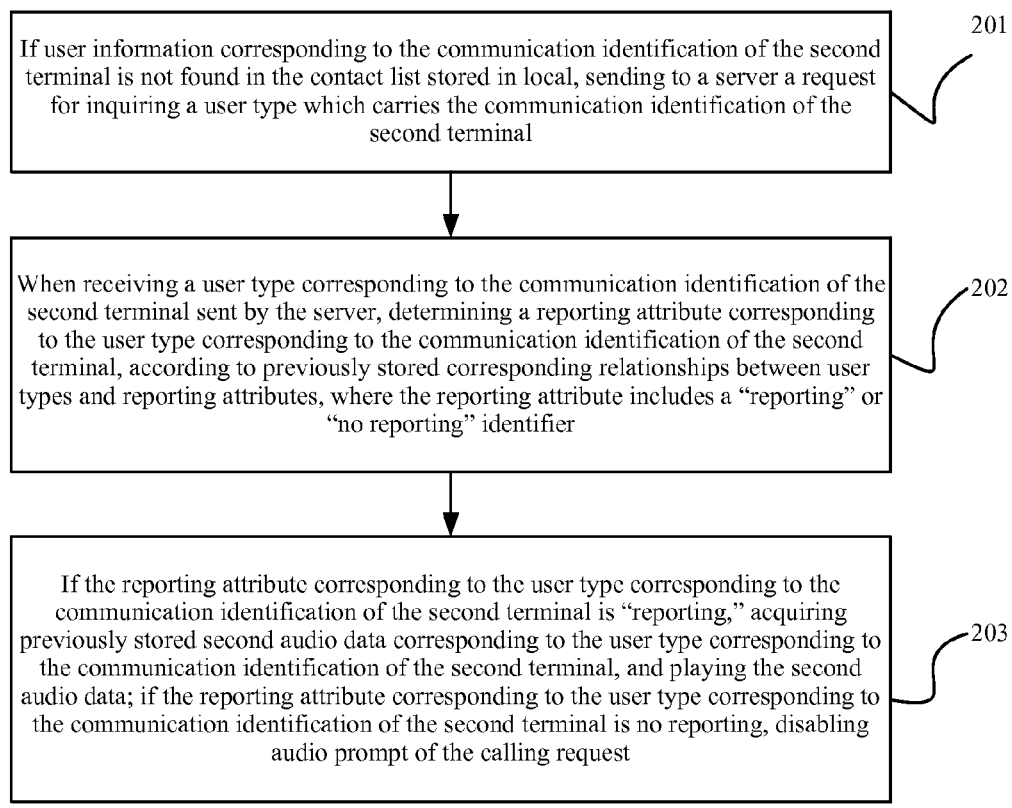
FIG. 2 is a flow chart of a method for prompting a calling request according to an exemplary embodiment.

Alternatively or additionally, if in step 102 user information corresponding to the communication identification of the second terminal is not found in the contact list stored in local, the local terminal may inquire user type of the second terminal with a server. The local terminal may receive the user type and play an audio file corresponding to the user type during the call. The corresponding process may be shown in FIG. 2, including the following steps.

In step 201, if user information corresponding to the communication identification of the second terminal is not found in the contact list stored in local, a request for inquiring a user type which carries the communication identification of the second terminal is sent to a server.

In an implementation, if it does not find user information corresponding to the communication identification of the second terminal in the contact list stored in local, the local terminal may generate a quest for inquiring a user type that carries the communication identification of the second terminal, and sends the quest for inquiring a user type to the server, to inquire the user type of the second terminal with the server. The server may categorize the user types according to public information or user reviews from previous calls. For example, the user type categories may include: express delivery, sales, fraud, or the like. The server may be a background server for the above voice call application.

The server may preset a plurality of user types, such as express delivery, sales, fraud, or the like. For each terminal installed with the application, during or after each call, the application may display a user-type-setting window in which user-type options to be set through the server may be displayed to allow the user to select a user type for the other party of the current call. After the user click a certain user-type option (for example, express delivery), the terminal will generate a request for setting a user type which carries the above user type selected by clicking and the communication identification (such as the telephone number) of the other party, and send the request for setting a user type to the server. The server may record the communication identification associated with the user type. Thereby, the server establishes a database of user types. When it receives the request for setting a user type sent by the local terminal, the server may acquire the communication identification carried by the request, inquire whether the user type corresponding to the communication identification is in the database of user types and returns a result to the local terminal if the database includes the user type information.

In step 202, when receiving a user type corresponding to the communication identification of the second terminal sent by the server, a reporting attribute corresponding to the user type corresponding to the communication identification of the second terminal is determined according to previously stored corresponding relationships between user types and reporting attributes, where the reporting attribute includes "reporting" or "no reporting" identifier.

For example, the user type may be "fraud", "express delivery", "sales" or the like. The reporting attribute is preset information as whether to report the calling request, which may include options such as "reporting" or "no reporting."

In an implementation, the above application installed on the local terminal may previously store reporting attributes corresponding to different user types, to establish corresponding relationships between user types and reporting attributes. The corresponding relationships may be stored in a form of a table as shown in Table 1. As for the corresponding relationships, they may be preset during development of the application and may be modified by the user during the usage.

TABLE 1

| user types | reporting attributes |
| --- | --- |
| express delivery | reporting |
| sales | no reporting |
| fraud | no reporting |

After receiving the user type corresponding to the communication identification of the second terminal sent by the server, the local terminal may search for a reporting attribute corresponding to the user type in the above table of corresponding relationships.

In step 203, if the reporting attribute corresponding to the user type corresponding to the communication identification of the second terminal is "reporting," previously stored second audio data corresponding to the user type corresponding to the communication identification of the second terminal is acquired, and the second audio data is played; if the reporting attribute corresponding to the user type corresponding to the communication identification of the second terminal is "no reporting," audio prompt of the calling request is disabled.

In an implementation, for each user type, the above application may previously store corresponding audio data to report the user type. For example, if the user type is "express delivery," the stored corresponding audio data is audio of "express delivery incoming call," or the like. When the local terminal determines that the reporting attribute corresponding to the user type corresponding to the communication identification of the second terminal, if the reporting attribute includes "reporting," the local terminal may acquire audio data (i.e. the second audio data) corresponding to the user type and play the audio data. The playing of the second audio data and the audio data of the call with the first terminal may be simultaneously performed; and if the reporting attribute includes "no reporting," the audio prompt of the calling request may be disabled, that is, the calling request is not prompted with any audio, including voice prompt, beep prompt (for example, a beep "du . . . du . . . "), or the like. At this time, relevant information on the calling request may be displayed on the screen, such as a telephone number, or the like.

Figure 3:
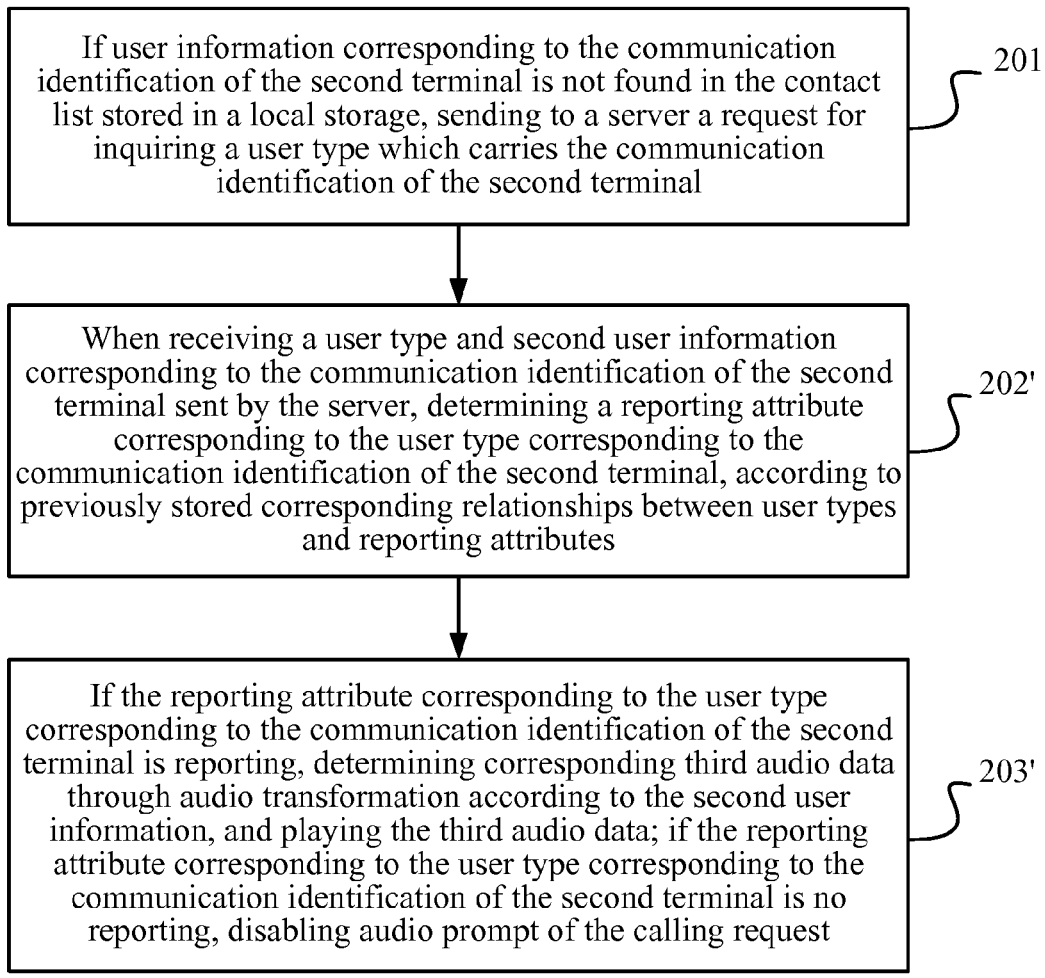
FIG. 3 is a flow chart of a method for prompting a calling request according to an exemplary embodiment.

Additionally or alternatively, in the above step 201, after the local terminal sends the request for inquiring a user type to the server, in addition to determining the user type of the second terminal, the server may also determine user information corresponding to the communication identification of the second terminal, and return it to the local terminal. In this case, the voice reporting may be performed based on the user information if it is required to report. The corresponding process may be shown in FIG. 3, including the following steps.

In step 202', when receiving a user type and second user information corresponding to the communication identification of the second terminal sent by the server, a reporting attribute corresponding to the user type corresponding to the communication identification of the second terminal is determined according to previously stored corresponding relationships between user types and reporting attributes.

For example, the second user information may be information about a company, or the like. For example, if the user type is "express delivery", the second user information may be "SF express delivery," "YTO express delivery," or the like.

In an implementation, when it establishes the database of the user types, for a certain user type, the server may acquire a set of communication identifications from companies corresponding to the user type, such as a set of telephone numbers, and store each of the communication identifications in the set of communication identifications associated with the corresponding user type. Moreover, information (such as company name) about the company may be stored as user information associated with each of the communication identifications. When it receives the request for inquiring a user type sent by the local terminal, the server may acquire the communication identification carried by the request, inquire the user type corresponding to the communication identification in the database of user types. Moreover, the user information (such as the above company name) corresponding to the communication identification may also be searched out to be returned to the local terminal. For example, the communication identification carried by the request for inquiring a user type received by the server is a telephone number of a delivery man from the SF express delivery, the server searches out the user type corresponding to the telephone number is express delivery, and corresponding user information is SF express delivery.

If the local terminal receives the user type and the user information (i.e. the second user information) sent by the server, the reporting attribute corresponding to the user type may be inquired in the above table of corresponding relationships.

In step 203', if the reporting attribute corresponding to the user type corresponding to the communication identification of the second terminal is "reporting," the device may convert the second user information to corresponding third audio data through an audio transformation according to the second user information. The device may then play the third audio data. If the reporting attribute corresponding to the user type corresponding to the communication identification of the second terminal is "no reporting," audio prompt of the calling request is disabled.

In an implementation, if the reporting attribute corresponding to the user type corresponding to the communication identification of the second terminal is "reporting," the process may be similar to step 103. The local terminal may perform audio transformation on the second user information, inquire audio data corresponding to each word in the textual information of the second user information in the above text-audio database and combine the audio data searched out in an order of the corresponding words, to obtain audio data corresponding to the second user information. Afterwards, the audio data may be inserted to a corresponding position of the above common audio data, to obtain audio data (i.e. the third audio data) to be played. Then, the local terminal may play the third audio data. The playing of the third audio data and the playing of audio data of the call with the first terminal may be simultaneously performed. For example, if the local terminal searches out the second user information is "SF express delivery", the user type is "express delivery", and the reporting attribute of "express delivery" is "reporting," the textual information of "S", "F", "express" and "delivery" may be transformed to audio data of "S", "F", "express" and "delivery", to obtain audio data of "SF express delivery". The audio data of "SF express delivery" is then inserted before the preset audio data "incoming call", to obtain audio data of "SF express delivery incoming call" which is played by the speaker.

If the reporting attribute corresponding to the user type corresponding to the communication identification of the second terminal is "no reporting," audio prompt of the calling request is disabled. That is, the calling request is not prompted with any audio, including voice prompt, beep prompt (for example, a beep "du . . . du . . . "), or the like. At this time, relevant information on the calling request may be displayed on the screen, such as a telephone number, or the like.

Alternatively or additionally, after the local terminal sends the request for inquiring a user type to the server in the above step 201, if it does not receive a user type returned by the server, the process may be one of the follows.

As a first process, when not receiving a user type corresponding to the communication identification of the second terminal sent by the server, the device may convert the communication identification of the second terminal to corresponding fourth audio data through an audio transformation according to the communication identification of the second terminal. The device may then play the fourth audio data.

In an implementation, after the local terminal sends the request for inquiring a user type to the server, if it does not receive a user type returned by the server during a preset time period (for example, 3 seconds), or receives a failure inquiring message sent by the sever, audio data corresponding to each word in the telephone number of the second terminal is inquired, and the audio data searched out is combined in an order of the corresponding words, to obtain audio data corresponding to the telephone number. Afterwards, the audio data may be inserted to a preset inserting position of the above common audio data, to obtain audio data (i.e. the fourth audio data) to be played. Then, the local terminal may play the fourth audio data. The playing of the fourth audio data and the playing of audio data of the call with the first terminal may be simultaneously performed.

As a second process, when not receiving a user type corresponding to the communication identification of the second terminal sent by the server, previously stored fifth audio data for prompting an unknown incoming call is acquired, and the fifth audio data is played.

In an implementation, the above application may previously store audio data (i.e. the fifth audio data) for prompting an unknown incoming call, for prompting a calling request from an unknown telephone number. For example, the audio data may be "unknown telephone incoming call", or the like. After the local terminal sends the request for inquiring a user type to the server, if it does not receive a user type returned by the server during a preset time period (for example, 3 seconds), or receives a failure inquiring message sent by the server, the audio data for prompting an unknown incoming call may be played.

As a third process, when not receiving a user type corresponding to the communication identification of the second terminal sent by the server, audio prompt of the calling request is disabled.

In an implementation, after the local terminal sends the request for inquiring a user type to the server, if it does not receive a user type returned by the server during a preset time period (for example, 3 seconds), or receives a failure inquiring message sent by the sever, the audio prompt of the calling request may be disabled. That is, the calling request is not prompted with any audio, including voice prompt, beep prompt (for example, a beep "du . . . du . . . "), or the like. At this time, relevant information on the calling request may be displayed on the screen, such as a telephone number, or the like.

In an embodiment of the present disclosure, there is provides a method for modifying the reporting attribute corresponding to the user type, the corresponding process may be as follows: it is received an instruction for setting a reporting attribute which carries a user type to be set and a reporting attribute to be set; and a reporting attribute corresponding to the user type to be set in the corresponding relationships between user types and reporting attributes is replaced by the reporting attribute to be set.

In an implementation, in the above application, a default reporting attribute may be set as corresponding to each user type. For example, "express delivery" corresponds to "reporting," "sales" corresponds to "no reporting," and "fraud" corresponds to "no reporting." During the usage, the user may modify the default reporting attribute. A setting page of the application may be provided with a setting window for setting the reporting attribute in which check boxes for user types and check boxes for reporting attributes may be contained. The user may select a desired user type through the check boxes for user types and may select "reporting" or "no reporting" through the check boxes for reporting attributes. Then the user may click a confirmation button, and the local terminal may receive the instruction for setting a reporting attribute which carries the user type (i.e. the user type to be set) and the reporting attribute selected by the user (i.e. the reporting attribute to be set). At this time, in the above table of corresponding relationships, the local terminal may modify the reporting attribute corresponding to the user type to be set to be the reporting attribute to be set. For example, the user may modify the reporting attribute corresponding to "sales" from "no reporting" to "reporting".

In the present embodiment, a device receives a calling request from a second terminal during a call session with a first terminal, where the calling request includes a communication identification of the second terminal. The device inquires whether first user information corresponding to the communication identification of the second terminal is in a contact list stored in a local storage. The device converts the first user information to corresponding first audio data through an audio transformation according to the first user information. The device may then play the first audio data during the call session. Thereby, when a user receives a calling request from a second terminal during a call session with a first terminal through a mobile phone hold in hand, the user may acquire user information on the second terminal from audio played by the speaker, without putting down the mobile phone to browse the contents displayed on the screen, thus information on the current call may not be missed. Thereby, the efficiency in acquiring information may be improved.

Figure 4:
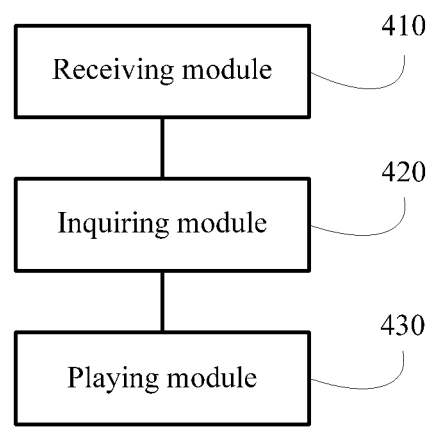
FIG. 4 is a block diagram of a device for prompting a calling request according to an exemplary embodiment.

Based on the same technical conception, a device for prompting a calling request is provided by embodiments of the present disclosure. As illustrated in FIG. 4, the device includes: a receiving module 410, an inquiring module 420, and a playing module 430.

The receiving module 410 is configured to receive a calling request from a second terminal during a call session with a first terminal, where the calling request carrying a communication identification of the second terminal.

The inquiring module 420 is configured to inquire first user information corresponding to the communication identification of the second terminal in a contact list stored in a local storage.

The playing module 430 is configured to determine corresponding first audio data through audio transformation according to the first user information, and play the first audio data.

Alternatively or additionally, the inquiring module 420 is further configured to: send a request to a server for inquiring a user type. For example, if user information corresponding to the communication identification of the second terminal is not found in the contact list stored in the local storage, inquiring module 420 may send to a server a request for inquiring a user type which carries the communication identification of the second terminal. When receiving a user type corresponding to the communication identification of the second terminal sent by the server, determine a reporting attribute corresponding to the user type corresponding to the communication identification of the second terminal, according to previously stored corresponding relationships between user types and reporting attributes, where the reporting attribute includes reporting or no reporting. If the reporting attribute corresponding to the user type corresponding to the communication identification of the second terminal is "reporting," acquire previously stored second audio data corresponding to the user type corresponding to the communication identification of the second terminal, and play the second audio data; if the reporting attribute corresponding to the user type corresponding to the communication identification of the second terminal is "no reporting," disable audio prompt of the calling request.

Alternatively or additionally, the inquiring module 420 is further configured to: determine a reporting attribute corresponding to the user type. For example, when receiving a user type and second user information corresponding to the communication identification of the second terminal sent by the server, determine a reporting attribute corresponding to the user type corresponding to the communication identification of the second terminal, according to previously stored corresponding relationships between user types and reporting attributes. If the reporting attribute corresponding to the user type corresponding to the communication identification of the second terminal is "reporting," determine corresponding third audio data through audio transformation according to the second user information, and play the third audio data; if the reporting attribute corresponding to the user type corresponding to the communication identification of the second terminal is "no reporting," disable audio prompt of the calling request.

Alternatively or additionally, the inquiring module 420 is further configured to: when not receiving a user type corresponding to the communication identification of the second terminal sent by the server, determine corresponding fourth audio data through audio transformation according to the communication identification of the second terminal, and play the fourth audio data; or when not receiving a user type corresponding to the communication identification of the second terminal sent by the server, acquire previously stored fifth audio data for prompting an unknown incoming call, and play the fifth audio data; or when not receiving a user type corresponding to the communication identification of the second terminal sent by the server, disable audio prompt of the calling request.

Alternatively or additionally, the device further includes a setting module, configured to: receive an instruction for setting a reporting attribute which carries a user type to be set and a reporting attribute to be set; and replace a reporting attribute corresponding to the user type to be set in the corresponding relationships between user types and reporting attributes by the reporting attribute to be set.

With respect to the device in the above embodiments, specific operations performed by each module have been described in detail in the embodiments of related methods, and detailed description will not be repeated herein.

In the present embodiment, a calling request from a second terminal is received during a call session with a first terminal, the calling request carrying a communication identification of the second terminal; first user information corresponding to the communication identification of the second terminal is inquired in a contact list stored in local; and corresponding first audio data is determined through audio transformation according to the first user information, and the first audio data is played. Thereby, when a user receives a calling request from a second terminal during a call session with a first terminal through a mobile phone hold in hand, the user may acquire user information on the second terminal from audio played by the speaker, without putting down the mobile phone to browse the contents displayed on the screen, thus information on the current call may not be missed. Thereby, the efficiency in acquiring information may be improved.

It should be noted that, in the method for prompting a calling request provided by the above-described embodiments, the prompting the calling request is only illustrated as implemented by the above functional modules for example. While in practice, the above functions may be performed by different modules as desired, that is, the internal structure of the device may be divided into different functional modules, so as to achieve all or a part of the functions described above. In addition, the method for prompting a calling request and the device for the same provided by the above-described embodiments belong to the same conception, therefore, the detailed implementing process of the device may be referred to the embodiments of the methods, and the detailed description thereof are not repeated herein.

The embodiments of the present disclosure provide a block diagram of a terminal. The terminal may be a mobile terminal such as a mobile phone.

Figure 5:
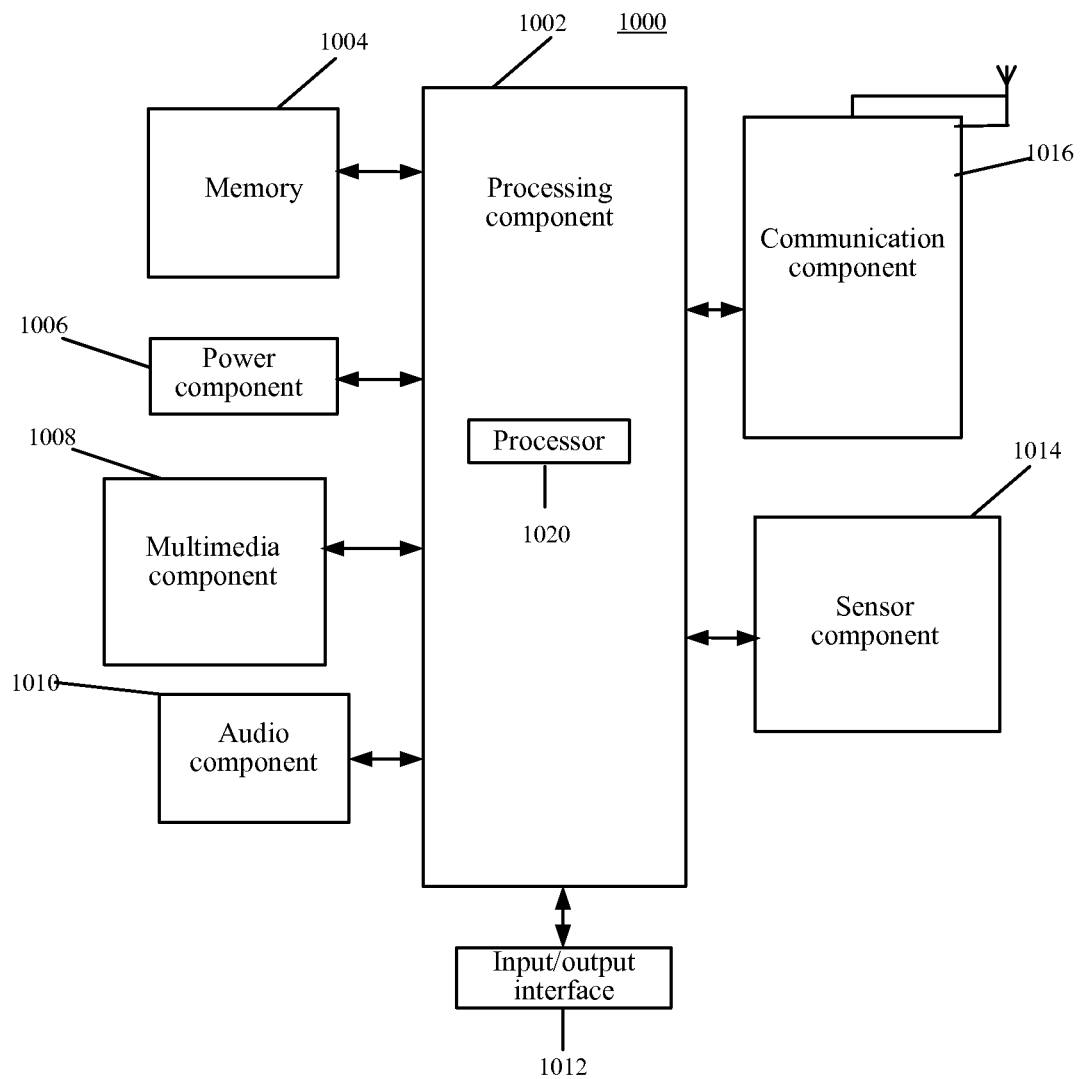
FIG. 5 is a block diagram of a terminal according to another exemplary embodiment.

Referring to FIG. 5, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a screen providing an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia datum while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the device 1000 and other devices. The device 1000 can access a wireless network based on a communication standard, such as WiFi, 2G, or 3G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In the above embodiments, the methods may be implemented at least partially in the device 1000, which may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

An non-transitory computer-readable storage medium, when instructions in the storage medium are executed by a processor of a terminal, the terminal is enabled to perform the method for prompting a calling request, the method includes:

receiving a calling request from a second terminal during a call session with a first terminal, the calling request carrying a communication identification of the second terminal;

inquiring whether first user information corresponding to the communication identification of the second terminal is in a contact list stored in a local storage; and converting the first user information to corresponding first audio data through an audio transformation according to the first user information, and playing the first audio data during the call session.

Alternatively or additionally, the method further includes: if user information corresponding to the communication identification of the second terminal is not found in the contact list stored in local, sending to a server a request for inquiring a user type which carries the communication identification of the second terminal. When receiving a user type corresponding to the communication identification of the second terminal sent by the server, determining a reporting attribute corresponding to the user type corresponding to the communication identification of the second terminal, according to previously stored corresponding relationships between user types and reporting attributes, where the reporting attribute includes "reporting" or "no reporting." If the reporting attribute corresponding to the user type corresponding to the communication identification of the second terminal is "reporting," acquiring previously stored second audio data corresponding to the user type corresponding to the communication identification of the second terminal, and playing the second audio data; if the reporting attribute corresponding to the user type corresponding to the communication identification of the second terminal is "no reporting," disabling audio prompt of the calling request.

Alternatively or additionally, the method further includes: when receiving a user type and second user information corresponding to the communication identification of the second terminal sent by the server, determining a reporting attribute corresponding to the user type corresponding to the communication identification of the second terminal, according to previously stored corresponding relationships between user types and reporting attributes. If the reporting attribute corresponding to the user type corresponding to the communication identification of the second terminal is "reporting," determining corresponding third audio data through audio transformation according to the second user information, and playing the third audio data; if the reporting attribute corresponding to the user type corresponding to the communication identification of the second terminal is "no reporting," disabling audio prompt of the calling request.

Alternatively or additionally, the method further includes: when not receiving a user type corresponding to the communication identification of the second terminal sent by the server, determining corresponding fourth audio data through audio transformation according to the communication identification of the second terminal, and playing the fourth audio data; or when not receiving a user type corresponding to the communication identification of the second terminal sent by the server, acquiring previously stored fifth audio data for prompting an unknown incoming call, and playing the fifth audio data; or when not receiving a user type corresponding to the communication identification of the second terminal sent by the server, disabling audio prompt of the calling request.

Alternatively or additionally, the method further includes: receiving an instruction for setting a reporting attribute which carries a user type to be set and a reporting attribute to be set; and replacing a reporting attribute corresponding to the user type to be set in the corresponding relationships between user types and reporting attributes by the reporting attribute to be set.

In the present embodiment, the device receives a calling request from a second terminal during a call session with a first terminal, where the calling request includes a communication identification of the second terminal. The device inquires whether the first user information corresponding to the communication identification of the second terminal is in a contact list stored in local. The device converts the first user information to corresponding first audio data through an audio transformation according to the first user information, and plays the first audio data. Thereby, when a user receives a calling request from a second terminal during a call session with a first terminal through a mobile phone hold in hand, the user may acquire user information on the second terminal from audio played by the speaker, without putting down the mobile phone to browse the contents displayed on the screen, thus information on the current call may not be missed. Thereby, the efficiency in acquiring information may be improved.

The methods, devices, and modules described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for prompting a calling request comprising:
receiving, by a device comprising a processor, a calling request from a second terminal during a call session with a first terminal, the calling request carrying a communication identification of the second terminal;
inquiring, by the device, whether first user information corresponding to the communication identification of the second terminal in a contact list is stored in a local storage;
categorizing the first user information to a user type when the first user information does not correspond to the communication identification of the second terminal in the contact list; and
obtaining a reporting attribute of the calling request according to the user type of the calling request,
disabling the calling request corresponding to the obtained reporting attribute being available and being equal to a pre-determined attribute, and
converting, by the device, the first user information to corresponding first audio data through an audio transformation according to the first user information, and playing the first audio data during the call session corresponding to the obtained reporting attribute being not equal to the pre-determined attribute.

2. The method according to claim 1, further comprising:
sending, to a server, a request for inquiring the user type that carries the communication identification of the second terminal, if user information corresponding to the communication identification of the second terminal is not found in the contact list stored in the local storage.

3. The method according to claim 2, further comprising:
receiving, at the device, the user type corresponding to the communication identification of the second terminal sent by the server;
determining the reporting attribute corresponding to the user type corresponding to the communication identification of the second terminal, according to previously stored corresponding relationships between similar user types and reporting attributes, wherein the reporting attribute comprises a reporting or no reporting identifier, and
if the reporting attribute corresponding to the user type corresponding to the communication identification of the second terminal is reporting, acquiring previously stored second audio data corresponding to the user type corresponding to the communication identification of the second terminal, and playing the second audio data.

4. The method according to claim 3, further comprising:
if the reporting attribute corresponding to the user type corresponding to the communication identification of the second terminal is no reporting, disabling audio prompt of the calling request.

5. The method according to claim 3, further comprising:
when receiving the user type and second user information corresponding to the communication identification of the second terminal sent by the server, determining the reporting attribute corresponding to the user type corresponding to the communication identification of the second terminal, according to previously stored corresponding relationships between user types and reporting attributes; and
if the reporting attribute corresponding to the user type corresponding to the communication identification of the second terminal is reporting, determining corresponding third audio data through audio transformation according to the second user information, and playing the third audio data; if the reporting attribute corresponding to the user type corresponding to the communication identification of the second terminal is no reporting, disabling audio prompt of the calling request.

6. The method according to claim 3, further comprising:
when not receiving the user type corresponding to the communication identification of the second terminal sent by the server, determining corresponding fourth audio data through audio transformation according to the communication identification of the second terminal, and playing the fourth audio data; or
when not receiving the user type corresponding to the communication identification of the second terminal sent by the server, acquiring previously stored fifth audio data for prompting an unknown incoming call, and playing the fifth audio data; or when not receiving the user type corresponding to the communication identification of the second terminal sent by the server, disabling audio prompt of the calling request.

7. The method according to claim 3, further comprising:
receiving an instruction for setting the reporting attribute that carries the user type to be set and the reporting attribute to be set; and
replacing the reporting attribute corresponding to the user type to be set in the corresponding relationships between user types and reporting attributes by the reporting attribute to be set.

8. A device for prompting a calling request, comprising:
a processor; and
a memory for storing instructions executable by the processor;
wherein the processor is configured to perform:
receiving a calling request from a second terminal during a call session with a first terminal, the calling request carrying a communication identification of the second terminal;
inquiring whether first user information corresponding to the communication identification of the second terminal is in a contact list stored in a local storage;
categorizing the first user information to a user type when the first user information does not correspond to the communication identification of the second terminal in the contact list; and
obtaining a reporting attribute of the calling request according to the user type of the calling request,
disabling the calling request corresponding to the obtained reporting attribute being available and being equal to a pre-determined attribute, and
converting the first user information to corresponding first audio data through an audio transformation according to the first user information, and playing the first audio data during the call session corresponding to the obtained reporting attribute being not equal to the pre-determined attribute.

9. The device according to claim 8, wherein the processor is further configured to perform:
sending to a server a request for inquiring the user type that carries the communication identification of the second terminal, if user information corresponding to the communication identification of the second terminal is not found in the contact list stored in the local storage.

10. The device according to claim 9, wherein the processor is further configured to perform:
when receiving the user type corresponding to the communication identification of the second terminal sent by the server, determining the reporting attribute corresponding to the user type corresponding to the communication identification of the second terminal, according to previously stored corresponding relationships between user types and reporting attributes, wherein the reporting attribute comprises a reporting or no reporting identifier; and
if the reporting attribute corresponding to the user type corresponding to the communication identification of the second terminal is reporting, acquiring previously stored second audio data corresponding to the user type corresponding to the communication identification of the second terminal, and playing the second audio data.

11. The device according to claim 10, wherein the processor is further configured to perform:
if the reporting attribute corresponding to the user type corresponding to the communication identification of the second terminal is no reporting, disabling audio prompt of the calling request.

12. The device according to claim 10, wherein the processor is further configured to perform:
when receiving a user type and second user information corresponding to the communication identification of the second terminal sent by the server, determining the reporting attribute corresponding to the user type corresponding to the communication identification of the second terminal, according to previously stored corresponding relationships between user types and reporting attributes; and
if the reporting attribute corresponding to the user type corresponding to the communication identification of the second terminal is reporting, determining corresponding third audio data through audio transformation according to the second user information, and playing the third audio data; if the reporting attribute corresponding to the user type corresponding to the communication identification of the second terminal is no reporting, disabling audio prompt of the calling request.

13. The device according to claim 10, wherein the processor is further configured to perform:
when not receiving the user type corresponding to the communication identification of the second terminal sent by the server, determining corresponding fourth audio data through audio transformation according to the communication identification of the second terminal, and playing the fourth audio data; or
when not receiving the user type corresponding to the communication identification of the second terminal sent by the server, acquiring previously stored fifth audio data for prompting an unknown incoming call, and playing the fifth audio data; or
when not receiving the user type corresponding to the communication identification of the second terminal sent by the server, disabling audio prompt of the calling request.

14. The device according to claim 10, wherein the processor is further configured to perform:
receiving an instruction for setting a reporting attribute that carries the user type to be set and the reporting attribute to be set; and
replacing the reporting attribute corresponding to the user type to be set in the corresponding relationships between user types and reporting attributes by the reporting attribute to be set.

15. A non-transitory computer-readable storage medium storing instructions that, when executed by a processor of a server, cause the server to perform:
receiving a calling request from a second terminal during a call session with a first terminal, the calling request carrying a communication identification of the second terminal;
inquiring whether first user information corresponding to the communication identification of the second terminal is in a contact list stored in a local storage;
categorizing the first user information to a user type when the first user information does not correspond to the communication identification of the second terminal in the contact list; and
obtaining a reporting attribute of the calling request according to the user type of the calling request,
disabling the calling request corresponding to the obtained reporting attribute being available and being equal to a pre-determined attribute, and
converting the first user information to corresponding first audio data through an audio transformation according to the first user information, and playing the first audio data during the call session corresponding to the obtained reporting attribute being not equal to the pre-determined attribute.

16. The non-transitory computer-readable storage medium according to claim 15, wherein the server is further caused to perform:

sending to a server a request for inquiring the user type that carries the communication identification of the second terminal, if user information corresponding to the communication identification of the second terminal is not found in the contact list stored in the local storage.

17. The non-transitory computer-readable storage medium according to claim 15, wherein the server is further caused to perform:

when receiving the user type corresponding to the communication identification of the second terminal sent by the server, determining the reporting attribute corresponding to the user type corresponding to the communication identification of the second terminal, according to previously stored corresponding relationships between user types and reporting attributes, wherein, the reporting attribute comprises a reporting or no reporting identifier; and if the reporting attribute corresponding to the user type corresponding to the communication identification of the second terminal is reporting, acquiring previously stored second audio data corresponding to the user type corresponding to the communication identification of the second terminal, and playing the second audio data; if the reporting attribute corresponding to the user type corresponding to the communication identification of the second terminal is no reporting, disabling audio prompt of the calling request.

18. The non-transitory computer-readable storage medium according to claim 15, wherein the server is further caused to perform:

when receiving the user type and second user information corresponding to the communication identification of the second terminal sent by the server, determining the reporting attribute corresponding to the user type corresponding to the communication identification of the second terminal, according to previously stored corresponding relationships between user types and reporting attributes; and if the reporting attribute corresponding to the user type corresponding to the communication identification of the second terminal is reporting, determining corresponding third audio data through audio transformation according to the second user information, and playing the third audio data; if the reporting attribute corresponding to the user type corresponding to the communication identification of the second terminal is no reporting, disabling audio prompt of the calling request.

19. The non-transitory computer-readable storage medium according to claim 15, wherein the server is further caused to perform:

when not receiving the user type corresponding to the communication identification of the second terminal sent by the server, determining corresponding fourth audio data through audio transformation according to the communication identification of the second terminal, and playing the fourth audio data; or when not receiving the user type corresponding to the communication identification of the second terminal sent by the server, acquiring previously stored fifth audio data for prompting an unknown incoming call, and playing the fifth audio data; or when not receiving the user type corresponding to the communication identification of the second terminal sent by the server, disabling audio prompt of the calling request.

20. The non-transitory computer-readable storage medium according to claim 15, wherein the server is further caused to perform:

receiving an instruction for setting the reporting attribute that carries the user type to be set and the reporting attribute to be set; and replacing the reporting attribute corresponding to the user type to be set in the corresponding relationships between user types and reporting attributes by the reporting attribute to be set.

* * * * *